United States Patent [19]

McShane

[11] Patent Number: 4,610,167
[45] Date of Patent: Sep. 9, 1986

[54] APPARATUS FOR MEASURING FLOW VELOCITY OF FLUIDS

[75] Inventor: James L. McShane, Churchill Boro, Pa.

[73] Assignee: Westinghouse Electric Corp., Pittsburgh, Pa.

[21] Appl. No.: 633,815

[22] Filed: Jul. 23, 1984

[51] Int. Cl.$^4$ .............................................. G01F 1/66
[52] U.S. Cl. ................................................. 73/861.28
[58] Field of Search ........... 73/861.18, 861.27, 861.28, 73/861.29, 861.31

[56] References Cited

U.S. PATENT DOCUMENTS

| | | | |
|---|---|---|---|
| 2,708,366 | 5/1955 | Blocher et al. | 73/861.31 |
| 3,243,768 | 3/1966 | Roshon, Jr. et al. | |
| 3,555,899 | 1/1971 | Yamamoto et al. | |
| 3,678,731 | 7/1972 | Wells et al. | |
| 3,869,915 | 3/1975 | Baumoel | |
| 3,906,791 | 9/1975 | Lynnworth | 73/861.29 |
| 4,004,461 | 1/1977 | Lynnworth | 73/861.27 |
| 4,098,117 | 7/1978 | Baumoel | |
| 4,103,551 | 8/1978 | Lynnworth | 73/861.27 |
| 4,195,517 | 4/1980 | Kalinoski et al. | |

OTHER PUBLICATIONS

L. C. Lynnworth–IEEE Transactions on Sonics & Ultrasonics, vol. SU-22, No. 2, p. 75, Mar. 1975.
L. C. Lynnworth–Physical Acoustics, vol. XIV, pp. 407, 427–429, Academic Press, Inc.—1979.

Primary Examiner—Charles A. Ruehl
Attorney, Agent, or Firm—L. A. DePaul

[57] ABSTRACT

Disclosed is an apparatus for overcoming acoustic path angle limitations and transducer coupling problems when an ultrasonic flow measurement method is used to measure water velocity in annular regions such as the downcomer of a nuclear steam generator. In accordance with one embodiment, two axially spaced ultrasonic transducers are coupled perpendicularly to the outer surface of a shell and align respectively with two 45° reflecting surfaces on a structure which is inserted into the downcomer during shutdown. The acoustic path between reflecting surfaces is essentially in line with the fluid flow as desired for best sensitivity and accuracy. Acoustic performance is optimized and transducer mounting is simplified by having the transducers perpendicular to the shell surface. Other embodiments are disclosed for measuring the average flow velocity by angling the acoustic path across the annular region of the downcomer.

28 Claims, 14 Drawing Figures

APPARATUS FOR MEASURING FLOW VELOCITY OF FLUIDS

BACKGROUND OF THE INVENTION

The present invention relates in general to an apparatus for measuring the flow velocity of various fluids, and more particularly, to an ultrasonic flowmeter of the type employing externally arranged transducers and internally arranged acoustic reflectors for the nonintrusive measurement of fluid velocity within a conduit such as a pipe, channel, annular region, and the like.

Fluid flow velocity may be determined from the measurement of the time taken for acoustic pulses to traverse a predetermined path in the fluid respectively in the direction of flow and opposite to the direction of flow. These time measurements may be carried out using two pairs of transducers, each pair comprising a transmitter and a receiver of, for example, ultrasonic acoustic pulses. The transducers are arranged so that the ultrasonic acoustic pulses travel along equal length paths in opposite directions within the fluid whose velocity is being determined.

One of the many applications for which ultrasonic methods have unique capabilities is in the measurement of water flow in the annular downcomer region of nuclear power plant steam generators. The downcomer annulus is that space between the heavy steel outer shell and the thinner steel wrapper which surrounds the tube bundle. Typical radial dimensions of the downcomer are 3 inches for the shell, 2.5 inches for the annulus, and 0.38 inches for the wrapper.

It has been recognized that downcomer fluid flow is an important parameter in the controlled operation of recirculating steam generators, yet, no suitable instrument for flow measurement in the downcomer annulus is presently available. As a result of the downcomer construction, the ultrasonic transducers must be arranged on the outside of the outer shell and on the same side of the flow region. The refraction of the acoustic pulses at the steel-water interface restricts the path angle of the acoustic pulses in the fluid to a direction more nearly perpendicular to the fluid flow direction than is desired for good sensitivity. This applies to the travel time difference method of determining the velocity of fluid flow in which the flow component $v \cos \theta$ is sensed, where $v$ is the flow velocity and $\theta$ is the angle between the flow vector and the acoustic path. It can therefore be appreciated that as the angle between the flow vector and the acoustic path increases, there is a corresponding decrease in the sensitivity of the ultrasonic flowmeter. This is particularly a disadvantage when measuring water flow in the annular downcomer region of nuclear power plant steam generators.

It has been found that even if shear acoustic pulses are propogated in the steel outer shell, the minimum value obtainable of $\theta$ is about 65° in room temperature water. At the typical operating temperature of 600° F. for nuclear power plant steam generators, the reduced sound velocity in water limits the minimum value obtainable of $\theta$ to about 75°. Thus, the change of $\theta$ with temperature, the internal reflections in the steel outer shell, and the necessity to couple transducers at an angle to the outer shell are factors that complicate the design of the ultrasonic flowmeter and seriously reduces its potential accuracy. Accordingly, it can be appreciated that there is an unsolved need for an ultrasonic flowmeter for the nonintrusive measurement of water flow in conduits, such as in the annular downcomer region of nuclear power plant steam generators which has good sensitivity by minimizing the angle between the flow vector and the acoustic path.

SUMMARY OF THE INVENTION

It is broadly an object of the present invention to provide an apparatus for measuring the flow velocity of fluids within a conduit, which overcomes or avoids one or more of the foregoing disadvantages, and particularly those resulting from a loss of sensitivity due to the increase in the angle between the flow vector and the acoustic path, and which fulfills the specific requirements of such an apparatus for the nonintrusive measurement of water flow in a conduit. Specifically, it is within the contemplation of one aspect of the present invention to provide an ultrasonic flowmeter for the nonintrusive measurement of water flow in the annular downcomer region of nuclear power plant steam generators having a maximum sensitivity when employing the travel time difference method in which the flow component $v \cos \theta$ is sensed.

Another object of the present invention is to provide an apparatus for measuring the flow velocity of fluids in which acoustic performance is optimized and ultrasonic transducer mounting is simplified.

Another object of the present invention is to provide an apparatus for measuring the flow velocity of fluids which overcomes acoustic path angle limitations and ultrasonic transducer coupling problems.

Another object of the present invention is to provide an apparatus for measuring the flow velocity of fluids having means for controlling the angle between the flow vector and the acoustic path.

Another object of the present invention is to provide an apparatus for measuring the flow velocity of fluids wherein the acoustic path within the fluid can be altered.

Another object of the present invention is to provide an apparatus for measuring the average flow velocity of fluids within a conduit by angling the acoustic path across the conduit.

Another object of the present invention is to provide an apparatus for measuring the flow velocity of fluids within a conduit which provides minimal flow restrictions to the fluid flow.

In accordance with one embodiment of the present invention, there is provided an apparatus for measuring the velocity of a fluid flowing within a conduit. The apparatus is constructed of a first and second transducer means arranged on the outer surface of the conduit at spaced-apart locations for transmitting and receiving signals along a signal path within the fluid, the transducer means arranged substantially normal to the outer surface of the conduit along a common side thereof, and reflecting means arranged within the conduit along the signal path for reflecting the signals transmitted from the first transducer to the second transducer.

BRIEF DESCRIPTION OF THE DRAWINGS

The above description, as well as further objects, features and advantages of the present invention will be understood by reference to the following detailed description of the presently preferred, but nonetheless illustrative, apparatus for measuring flow velocity of fluids in accordance with the present invention, when taken in conjunction with the accompanying drawings, wherein.

DETAILED DESCRIPTION OF THE INVENTION

Figure 1:
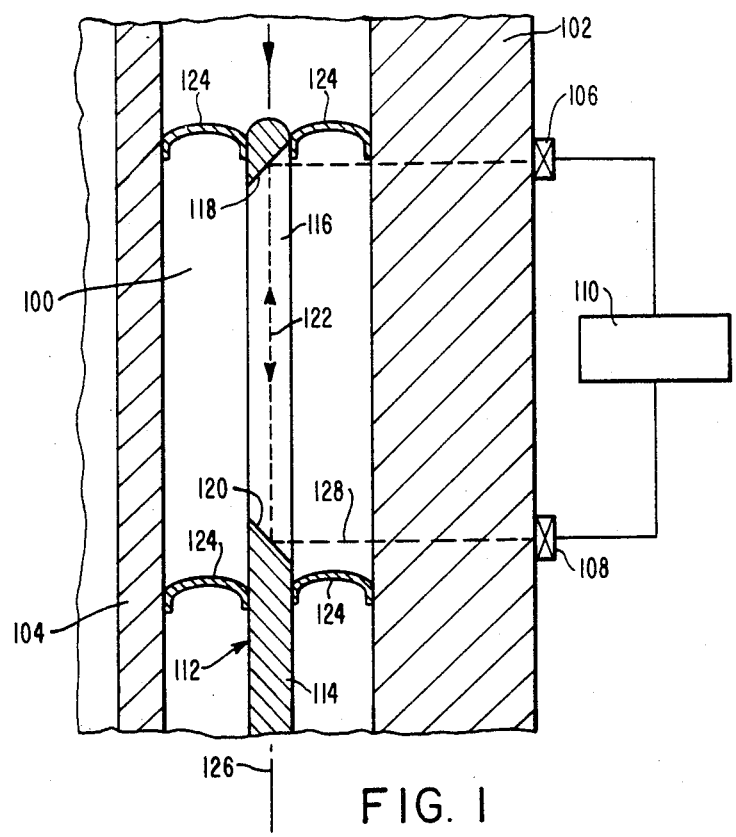
FIG. 1 is a side elevational view in partial cross-section illustrating an ultrasonic flowmeter arranged for the nonintrusive measurement of water flow in the annular downcomer region of a nuclear power plant steam generator constructed of a pair of externally mounted transducers and an internally arranged reflector structure in accordance with one embodiment of the present invention.

Referring now to the drawings, wherein like reference numerals represent like elements, there is shown in FIG. 1 the construction of an ultrasonic flowmeter in accordance with one embodiment of the present invention adapted for measuring the flow velocity of a fluid within a conduit, such as a pipe, channel, annular region, and the like. One application for the ultrasonic flowmeter of the present invention is for the nonintrusive measurement of water flow in the annular downcomer region of nuclear power plant steam generators as specifically shown in FIG. 1. The downcomer annulus 100 is the space provided between a heavy steel outer shell 102 and a thinner steel wrapper 104 which surrounds a tube bundle (not shown). The ultrasonic flowmeter is constructed of a pair of spaced-apart ultrasonic transducers 106, 108 each including, for example, a piezoelectric crystal adapted to generate acoustic pulses when electrically excited. Similarly, when acoustic pulses are received by these piezoelectric crystals, corresponding electrical output signals are produced. The piezoelectric crystals within the ultrasonic transducers 106, 108 are electrically excited by an electronic control circuit 110, which circuit is also responsive to the electrical output signals of the piezoelectric crystals for determining the flow velocity of the fluid within the downcomer annulus 100.

Figure 3:
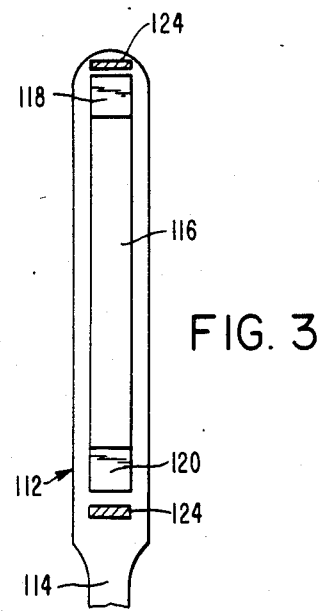
FIG. 3 is a front elevational view of the reflector structure, as illustrated in FIG. 1, having a pair of spaced-apart reflecting surfaces adapted for providing an acoustic path therebetween.

A reflector structure 112 is arranged within the downcomer annulus 100 at a location opposite the transducers 106, 108. The reflector structure 112, as also shown in FIG. 3, is constructed of a probe-like member 114 having a longitudinally extending opening 116 terminating at either end thereof by a pair of reflecting surfaces 118, 120. The reflecting surfaces 118, 120 are, in accordance with the embodiment illustrated, arranged at a 45° angle to the longitudinal axis of the reflector structure 112 so as to define an acoustic path 122 within the opening 116 and aligned along the longitudinal axis of the reflector structure. Optionally, a plurality of spoke-like outwardly extending spring spacers 124 may be provided secured to the reflective structure 112 adjacent the reflecting surfaces 118, 120. The spring spacers 124 permit the removable positioning of the reflector structure 112 within the downcomer annulus 100 by the compressive engagement of the spring spacers with the surface of the outer shell 102 and opposing surface of the wrapper 104.

Figure 2:
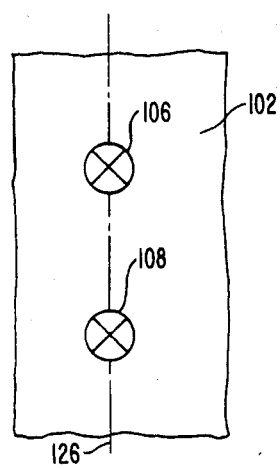
FIGS. 2 and 6 are front elevational views of a conduit illustrating the location of a pair of transducers with regard to the longitudinal axis of the conduit for measuring the flow velocity of a fluid therein in accordance with the ultrasonic flowmeter of the present invention.

As previously noted, in the application of the travel time difference method of measuring flow velocity using acoustic pulses, the flow component $v \cos \theta$ is sensed, where v is flow velocity and $\theta$ is the angle between the flow vector and the acoustic path. In order to maximize the sensitivity of the ultrasonic flowmeter, the acoustic path angle $\theta$ is minimized in accordance with the construction and arrangement of the reflector structure 112 as illustrated in the embodiment of the present invention of FIG. 1. The transducers 106, 108 are coupled normal or perpendicular to the outer surface of the outer shell 102 and arranged one above the other in linear alignment with the longitudinal axis 126 of the downcomer annulus 100, as shown in FIG. 2. The excitation of the piezoelectric crystals within the transducers 106, 108 by the electronic control circuit 110 results in the propogation of acoustic pulses along an acoustic path 128 within the downcomer annulus 100. As a result of the transducers 106, 108 being secured normal to the outer surface of the outer shell 102, the acoustic pulses are propogated along a portion of the acoustic path 128 normal to the longitudinal axis 126 of the downcomer annulus 100 and normal to the inner surface of the outer shell 102. That is, the interface of the inner surface of the outer shell 102 and the fluid flowing within the downcomer annulus 100 does not refract the acoustic pulses, as would occur had the transducers been coupled at an angle to the outer surface of the outer shell 102.

The reflector structure 112 is positioned within the downcomer annulus 100 such that the reflecting surfaces 118, 120 intersect the acoustic pulses being propogated by the transducers 106, 108 along the acoustic path 128. As evidenced in FIG. 1 the acoustic pulses propogating along the acoustic path 122, defined between the reflecting surfaces 118, 120 of the reflector structure 112, are in alignment with the longitudinal axis 126 of the downcomer annulus 100 whereby the angle between the flow vector and the acoustic path, i.e., $\theta$, is equal to zero thereby maximizing the magnitude of the flow component $v \cos \theta$ for increased sensitivity of the ultrasonic flowmeter. The reflector structure 112, when used for the nonintrusive measurement of water flow in the downcomer annulus 100 of a nuclear power plant steam generator can be installed through a handhole during shutdown or, preferably, can be included in the steam generator design. Once the reflector structure 112, as a passive structure, is installed inside the downcomer annulus 100, the installation of the transducers 106, 108 remains nonintrusive.

Briefly in operation, the acoustic pulses generated by transducer 106 are propogated downstream along the acoustic path 122, 128 and received by transducer 108 at a time T1. Similarly, acoustic pulses are generated either sequentially or simultaneously by transducer 108 and propogated upstream along the acoustic path 122, 128 and received by transducer 106 at a time T2. The electric output signals from transducers 106, 108, responsive to the respectively received acoustic pulses, are transmitted to the electronic control circuit 110 for determination of the flow velocity by the travel time difference, i.e., a function of the time differential T1–T2 of the acoustic pulse received by the transducers 106, 108. The specific manner of determining the flow velocity from the received acoustic pulses can be calculated in accordance with a number of mathematical operations known to those having ordinary skill in the art, for example, as disclosed in U.S. Pat. Nos. 3,653,259 and 3,901,078. Likewise, the electronic control circuit 110 for exciting the piezoelectric crystals within the transducers 106, 108 and for calculating the flow velocity is equally well-known to those skilled in art, for example, circuits adaptable for use with the present invention are Westinghouse Models LEFM 801A and 8824 electric assemblies. Accordingly, the present invention is not limited to the specific design of the electronic control circuit 110 or the specific manner of manipulating the signal received by the electronic control circuit in response to the acoustic pulses received by the transducers 106, 108.

In accordance with the ultrasonic flowmeter employing the reflector structure 112 as shown in FIG. 1, the fluid velocity of that portion of the fluid flowing within the downcomer annulus 100 along the acoustic path 122 defined between the reflecting surfaces 118, 120 is determined, i.e., the fluid flow component flowing along the longitudinal axis 126 of the downcomer annulus. This measured representative flow velocity can be related to the average flow velocity over the downcomer annulus 100 by known flow profile relationships. The velocity of the flow component at locations other than along the longitudinal axis 126 of the downcomer annulus 100 may be determined by positioning the reflector structure 112 such that the acoustic path 122 lies along other flow paths within the cross-sectional area of the downcomer annulus. Thus, the reflector structure 112 is suitable for determining the specific velocity of a flow component at various positions within the downcomer annulus 100. Successive measurements of the velocity of the various flow components can be used to facilitate the calculation of the average velocity over the downcomer annulus 100.

Figure 4:
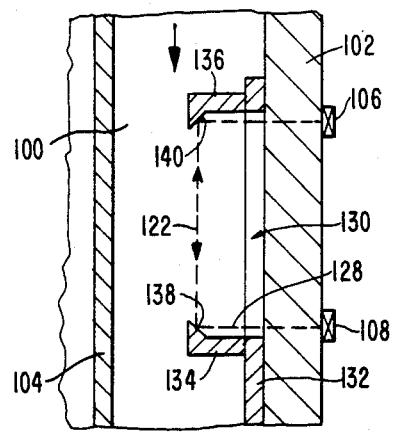
FIGS. 4, 5 and 7-11 are cross-sectional views of an ultrasonic flowmeter illustrating a reflector structure arranged in accordance with various embodiments of the present invention.

There will now be described various other embodiments of the construction and arrangement of the reflector structure 112 as thus far described with respect to the embodiment shown in FIGS. 1 and 3. Turning now to FIG. 4, the reflector structure 130 is constructed of a support member 132 including a pair of spaced-apart reflector arms 134, 136 each provided with a reflecting surface 138, 140, respectively. As shown, the reflector structure 130 is placed against the inner surface of the outer shell 102 adjacent the transducers 106, 108. The reflecting surfaces 138, 140 are arranged along the acoustic path 128 in the manner as previously described with respect to the embodiment of FIG. 1. In this regard, the reflecting surfaces 138, 140 are arranged at a 45° angle to the longitudinal axis of the downcomer annulus 100 to provide the acoustic path 122 therebetween. By placing the reflector structure 130 against the inner surface of the outer shell 102 adjacent the transducers 106, 108, the abrupt construction of the terminal ends of the arms 134, 136 can create a degree of turbulence of the fluid flowing within the downcomer annulus 100. To effectively minimize or eliminate such turbulence, the construction and arrangement of a reflector structure 142 as shown in FIG. 5 is provided.

Figure 5:
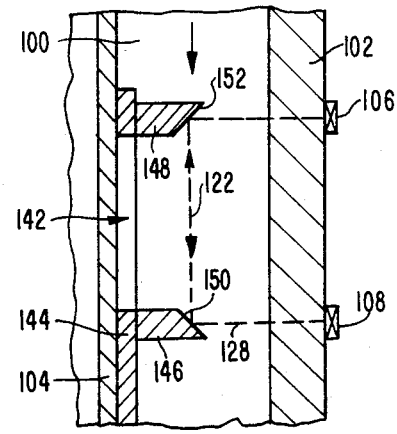
Figure 6:
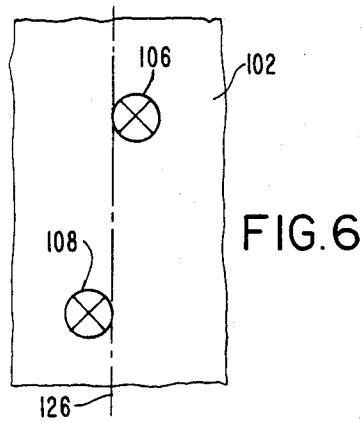
Figure 7:
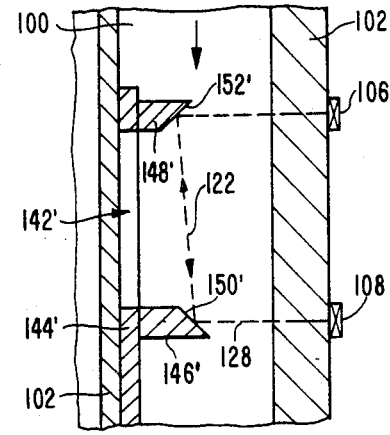

As shown in FIG. 5, the reflector structure 142 is constructed of a support member 144 having a pair of spaced-apart reflector arms 146, 148 each terminating at a reflecting surface 150, 152, respectively. The reflector structure 142 is placed against the outer surface of the wrapper 104 and having the reflecting surfaces 150, 152 arranged in alignment with the transducers 106, 108 along the acoustic path 128. As a result of the contour of the terminal ends of the arms 146, 148, fluid turbulence is thereby reduced. The disturbing effects of the upstream arm 136, 148 on acoustic propogation can be essentially avoided by tilting the acoustic path in the tangential plane as shown in FIG. 6. In this regard, the transducers 106, 108 are arranged on either side of the longitudinal axis 126 of the outer shell 102. The reflector structures 130, 142 can be positioned within the downcomer annulus 100 accordingly with the acoustic path 122 provided between their reflecting surfaces 138, 140 and 150, 152 being arranged in alignment with a line passing through the transducers 106, 108. Alternatively, the disturbing effects of the upstream arms 136, 148 can be essentially avoided by radially tilting the acoustic path in the manner shown in FIG. 7. As shown in FIG. 7, the upstream arm 148' extends radially within the downcomer annulus 100 a shorter distance than the downstream arm 146'. In this manner, the acoustic path 122 between the reflecting surfaces 150', 152', is removed from the region of the fluid disturbance created by the upstream arm 148'.

In the preceding embodiments of the present invention, a representative fluid velocity is measured that can be related to an average fluid velocity over the downcomer annulus 100 by known fluid flow profile relationships. The average fluid velocity can also be measured by angling the acoustic path across the downcomer annulus 100, as to be described with regard to the embodiments shown in FIGS. 8–12. The acoustic path, which includes a reflection off the surface of the outer shell 102 or wrapper 104, as shown in FIGS. 8, 10, 11 and 12, allows the reflectors to be arranged on the same side of the downcomer annulus 100. However, such construction relies on having a specific annular dimension or on positioning the reflecting surfaces a fixed distance from the surface of the outer shell 102 or wrapper 104.

Figure 8:
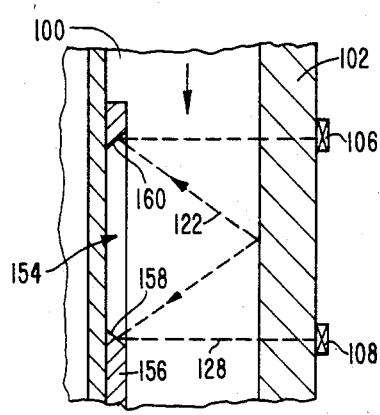
Figure 10:
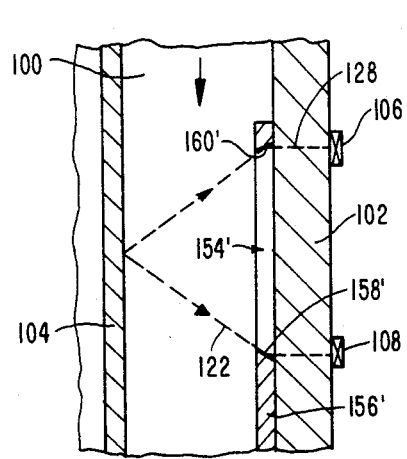

As shown in FIG. 8, a reflector structure 154 is constructed of a support member 156 having a pair of reflecting surfaces 158, 160 arranged within the support member. The reflector structure 154 is held against the outer surface of the wrapper 102 and having the reflecting surfaces 158, 160 arranged in alignment with the transducers 106, 108 along the acoustic path 128. In accordance with this embodiment, the acoustic path 122 defined between the reflecting surfaces 158, 160 reflects off of the inner surface of the outer shell 102 thereby angling the acoustic path across the downcomer annulus 100 for determining the average fluid velocity therethrough. As shown in FIG. 10, a similarly constructed reflector structure 154' is held against the inner surface of the outer shell 102 to provide an acoustic path 122 between the reflecting surfaces 158', 160' which reflects off the outer surface of the wrapper 104. The reflector structures 154, 154' are substantially identical in construction except that the angle of their reflecting surfaces 158, 160, 158', 160' are arranged at the required angle to receive and reflect the acoustic pulses along the acoustic paths 122, 128 to and from the transducers 106, 108.

Figure 9:
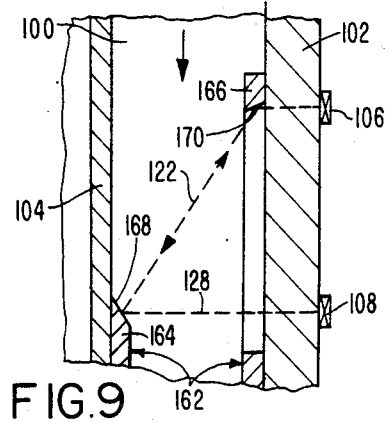

Turning now to FIG. 9, there is disclosed another embodiment of the present invention, wherein the reflector structure 162 is constructed of a pair of support members 164, 166 each having a reflecting surface 168, 170. As shown, the support member 164 is held against the outer surface of the wrapper 104 and having its reflecting surface 168 arranged in alignment with transducer 108 along acoustic path 128. However, the support member 166 is held against the inner surface of the outer shell 102 and having its reflecting surface 170 arranged in alignment with transducer 106 along acoustic path 128. In this manner, the reflecting surfaces 168, 170 define an acoustic path 122 angled across the downcomer annulus 100.

Figure 11:
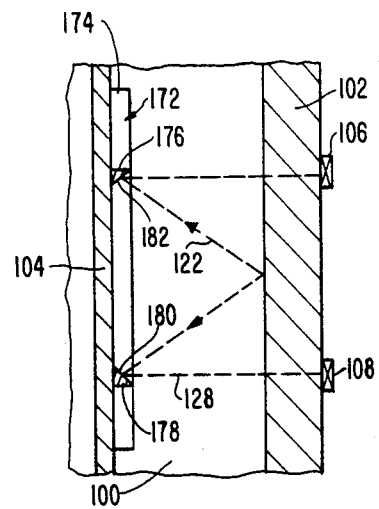

In accordance with another embodiment of the present invention as shown in FIG. 11, the reflector structure 172 is constructed of a plastic or polymer sleeve or lining 174, e.g., silicon rubber, epoxy and polyurethane, whose acoustic characteristics are close to those of water or other such liquids. Embedded within the polymer lining 174 are individual reflectors 176, 178 having reflecting surfaces 180, 182, respectively. The polymer lining 174 is secured to the outer surface of the wrapper 104 and having the reflecting surfaces 180, 182 arranged in alignment with the transducers 106, 108 along the acoustic path 128. In this regard, the acoustic path 122 defined between the reflecting surfaces 180, 182 reflects off the inner surface of the outer shell 104 so as to provide an angle acoustic path across the downcomer annulus 100. The use of a polymer lining 174 having embedded reflectors 176, 178 greatly minimizes fluid flow disturbances.

Figure 12:
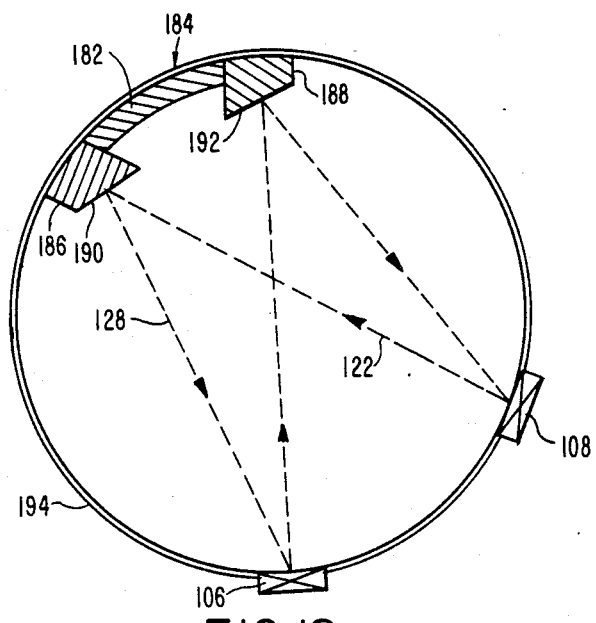
FIG. 12 is a top plan view of an ultrasonic flowmeter illustrating a reflector structure arranged in accordance with another embodiment of the present invention.

In accordance with another embodiment of the present invention, as shown in FIG. 12, a reflector structure 184 constructed of a support member 182 having a pair of spaced-apart reflector arms 186, 188, each provided with a reflecting surface 190, 192, respectively, is secured to the inner surface of a cylindrically-shaped conduit 194. The transducers 106, 108 and the reflecting surfaces 190, 192 are arranged such that the acoustic paths 122, 128 are chords of the conduit 194. The provision of chordal acoustic paths is also considered to avoid the disturbing effects of the upstream arm 186 within the conduit 194.

The present invention, as stated, is particularly advantageous when used for the nonintrusive measurement of water flow in the annular downcomer region of nuclear power plant steam generators. However, other applications such as flow within pipes and liquid level measurement in vessels is contemplated with the ultrasonic flowmeter of the present invention. The various reflector structures described herein will offer minimum flow restriction if maintained against a pipe wall. In addition, the reflector structures can be attached to a flange for clamping between pipe flanges during pipe assembly, or they can be welded just inside the end of a length of pipe before the pipes are welded together. The position of the installed reflector structures, in accordance with the present invention, can be determined from outside the outer shell 102 if the approximate location is known. For example, two transducers, one of which is a transmitter, in a fixture having the correct spacing and orientation, i.e., the same spacing and orientation as the reflecting surfaces, can be moved over the surface of the outer shell 102 until a signal is received at the other end. Alternatively, a projection or hole having a characteristic echo could be included in the reflector structure. If reflector structures are included in a nuclear power plant steam generator design, attachment to the outer shell 102 is preferable. Then, transducer locations can be marked on the exterior surface of the outer shell 102.

Figure 13:
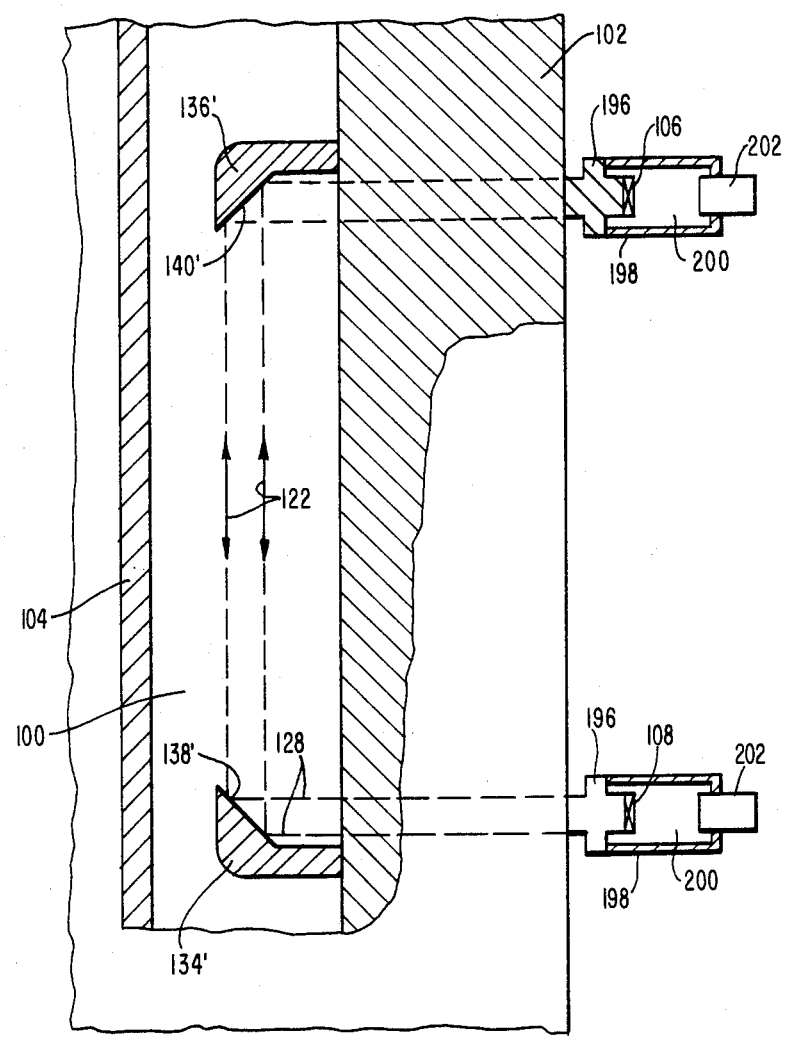
FIGS. 13 and 14 are side elevational views in partial cross-section of an ultrasonic flowmeter being integrally installed during the manufacture of a steam generator.
Figure 14:
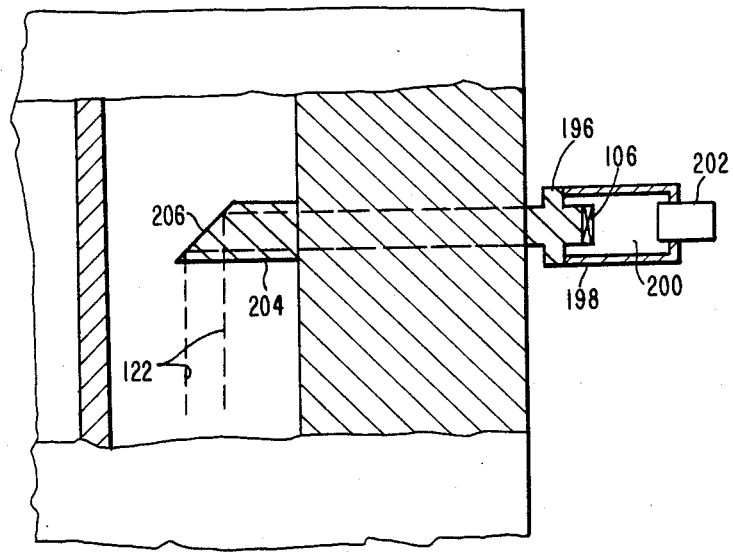

Also, standoffs 196 for mounting the transducers 106, 108 can be welded or brazed to the outside surface of the outer shell 102 at the right locations, as shown in FIGS. 13 and 14. The transducers 106, 108 are mounted within a housing 198 containing internal parts 200 for spring loading and electrical connection via electrical connector 202. Similarly, the reflector arms 134' 136' can be welded or brazed to the inner surface of the outer shell 102. As shown in FIG. 14, the reflector arm 204 is provided with a reflecting surface 206 adapted for internal reflection. Further, in the case of steam generators, the reflector structure can be installed through a handhole during shutdown or, preferably, can be included in the steam generator design. The reflector structures can also be extended up or down into the downcomer annulus 100.

Although the invention herein has been described with reference to particular embodiments, it is to be understood that these embodiments are merely illustrative of the principles and application of the present invention. For example, the use of any materials, relative dimensions and specific electronic techniques are contemplated. Further, it is contemplated that the reflector structures be formed from one piece of metal, while on the other hand, it is possible that they be constructed of a welded multi-component assembly. This construction, in addition to being simple and rugged, would maintain spacing and orientation of their reflecting surfaces without the need for precise alignment on installation. The arrangement of the reflecting surfaces in the embodiments disclosed in FIGS. 1, 4 and 5 provide an acoustic path between the reflecting surfaces that is in line with the fluid flow, i.e., $\theta$ equal to zero for maximum sensitivity, and which acoustic path can be made as long as desired for increased time differential. Still further, as an alternative technique, vortex shedding from the upstream reflector arm can be sensed ultrasonically in determining fluid flow velocity. It is, therefore, to be understood that numerous modifications may be made in the illustrative embodiments and that other arrangements may be devised without departing from the spirit and scope of the present invention as defined by the appended claims.

I claim:

1. An apparatus for measuring the velocity of a fluid flowing within a conduit, said apparatus comprising first and second transducer means arranged on the outer surface of said conduit at spaced-apart locations for transmitting and receiving signals along a signal path within said fluid, said transducer means arranged substantially normal to the outer suface of said conduit and substantially along a common longitudinal axis thereof, and a probe arranged wholly within the interior of said conduit, said probe having a pair of spaced-apart reflecting surfaces arranged along said signal path for reflecting said signals transmitted from said first transducer means to said second transducer means.

2. The apparatus of claim 1, wherein said tranducer means transmit said signals substantially normal to the direction of said fluid flowing within said conduit.

3. The apparatus of claim 1, wherein said transducer means are arranged in alignment with the longitudinal axis of said conduit.

4. The apparatus of claim 1, wherein at least one of said transducer means is arranged adjacent either side of the longitudinal axis of said conduit.

5. The apparatus of claim 1, wherein said reflecting surfaces further reflect said signals transmitted from said second transducer means to said first transducer means.

6. The apparatus of claim 1, wherein said reflecting surfaces are arranged within said fluid in alignment with the longitudinal axis of said conduit.

7. The apparatus of claim 1, wherein said probe is arranged on the interior surface of said conduit opposite said first and second transducer means.

8. The apparatus of claim 1, wherein said probe is arranged on the interior surface of said conduit adjacent to said first and second transducer means.

9. The apparatus of claim 1, wherein said probe is arranged on the interior surface of said conduit opposite and adjacent to said first and second transducer means.

10. The apparatus of claim 1, wherein said reflecting surfaces are arranged within said conduit for reflecting said signals along a signal path in alignment with the direction of said fluid flowing within said conduit.

11. The apparatus of claim 1, wherein said reflecting surfaces are arranged within said conduit for reflecting said signals along a signal path at an angle to the direction of said fluid flowing within said conduit.

12. The apparatus of claim 1, wherein said reflecting surfaces are arranged at 45° angles to the longitudinal axis of said conduit.

13. The apparatus of claim 1, wherein said reflecting surfaces are arranged in longitudinal alignment with one another and having common angles to the longitudinal axis of said conduit.

14. The apparatus of claim 1, wherein said reflecting surfaces are arranged other than in alignment with one another and having different angles to the longitudinal axis of said conduit.

15. The apparatus of claim 1, wherein said reflecting surfaces reflect said signals to said first and second transducer means along a path normal to the longitudinal axis of said conduit.

16. The apparatus of claim 1, wherein said reflecting surfaces are arranged for reflecting said signals along chordal paths within said conduit.

17. The apparatus of claim 1 further including electronic means responsive to said signals for determining the velocity of said fluid flowing within said conduit.

18. An apparatus for measuring the velocity of a fluid flowing within a conduit having a fluid path formed between an inner shell and a spaced-apart outer shell, said apparatus comprising first and second ultrasonic transducers secured substantially normal to the outer surface of said outer shell and arranged substantially along a common longitudinal axis thereof at spaced-apart locations for transmitting and receiving acoustic pulses along a signal path within said fluid, said transducers transmitting and receiving said acoustic pulses substantially normal to the longitudinal axis of said conduit, and a probe arranged wholly within said fluid path between said inner and outer shell, said probe having a pair of spaced-apart reflecting surfaces arranged along said signal path for reflecting said acoustic pulses between said first and second transducers.

19. The apparatus of claim 18, wherein said reflecting surfaces are adapted for reflecting said acoustic pulses in alignment with the direction of said fluid flowing within said conduit.

20. The apparatus of claim 18, wherein said reflecting surfaces are adapted for reflecting said acoustic pulses at an angle to the direction of said fluid flowing within said conduit.

21. The apparatus of claim 18, wherein said reflecting surfaces reflect said acoustic pulses to said first and second transducers normal to the longitudinal axis of said conduit.

22. The apparatus of claim 18, wherein said reflecting surfaces are provided within a layer of material arranged along said signal path overlying a portion of the interior surface of said inner shell.

23. The apparatus of claim 18, wherein said probe includes positioning means for removably positioning said probe between said inner and outer shell.

24. The apparatus of claim 18, wherein said probe is arranged along the interior surface of said inner shell opposite said transducers.

25. The apparatus of claim 18, wherein said probe is arranged along the interior surface of said outer shell adjacent said tranducers.

26. The apparatus of claim 18, wherein said reflecting surfaces are respectively arranged adjacent the interior surfaces of said inner and outer shells and in respective alignment with said first and second transducers.

27. The apparatus of claim 18, wherein said conduit comprises a downcomer annulus of a nuclear steam generator.

28. The apparatus of claim 18, wherein said reflecting surfaces are arranged along said signal path for reflecting said acoustic pulses off the interior surface of said conduit.

* * * * *